T. THISTLEWOOD.

Assignor of one-half interest to L. M. NEWBURY.

HORSESHOE.

No. 7,476. Reissued Jan. 23, 1877.

Witnesses
Fred G. Dieterich
W. J. Hutchinson

Inventor
Thomas Thistlewood
by Daniel Reed
Atty.

UNITED STATES PATENT OFFICE.

THOMAS THISTLEWOOD, OF SPARTA, WISCONSIN, ASSIGNOR OF ONE-HALF INTEREST TO LYMAN M. NEWBURY, OF SAME PLACE.

IMPROVEMENT IN HORSESHOES.

Specification forming part of Letters Patent No. 173,517, dated February 15, 1876; reissue No. 7,476, dated January 23, 1877; application filed June 24, 1876.

*To all whom it may concern:*

Figure 1:
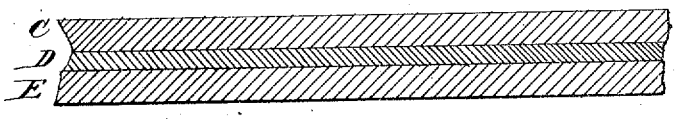

Be it known that I, THOMAS THISTLEWOOD, of Sparta, in the county of Monroe and State of Wisconsin, have invented a new and useful Improvement in Horseshoes, of which the following is a specification:

My improved horseshoe is made from a compound bar having a continuous layer of steel welded to continuous layers of iron, the bar being constructed substantially as follows:

Take two bars of iron, C and E, Figure 1, and place between them a bar of steel, D, and then roll them all together at welding-heat, so as to form a single bar having a continuous layer of steel running the whole length of the new or compound bar thus made. This compound bar is rolled to the proper size for making horseshoes, or what is known in the trade as "horseshoe-iron." Then the horseshoes are made in the usual way from this compound bar.

Figure 2:
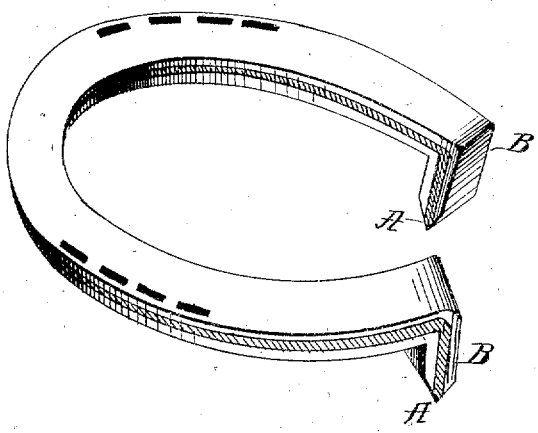

When the shoe is completed, the points of the calks consist of steel, as seen at A, Fig. 2. These calks are self-sharpening, because the softer iron at the sides of the calks wears away by use faster than the harder steel center or point of the calk; also, the nail-holes and the shoe itself are stronger and less liable to wear or break, on account of the greater strength and hardness of the steel.

In cutting old shoes made from such compound bar to fit a smaller foot, the steel will always form the point of the new calk, which will be self-sharpening.

I am aware that compound bars of steel and iron have been made in several ways by rolling bars of iron and steel together for other purposes; but I believe that a horseshoe made from a compound bar composed of two bars of iron with a continuous layer of steel interposed between them, as described, and therefore having the characteristics specified, is a novelty in the art.

Having thus described my invention, what I claim, and desire to secure by Letters Patent, is—

A horseshoe formed of continuous layer of steel welded between two layers of iron, for the purpose of increasing its stiffness, strengthening it around the nail-holes, and furnishing self-sharpening steel-pointed calks, substantially as specified.

In testimony that I claim the foregoing I have hereunto set my hand this 21st day of June, 1876.

THOMAS THISTLEWOOD.

Witnesses:
M. HANSON,
JOSEPH WANLAP.